US011025644B2

(12) United States Patent
Fasoli et al.

(10) Patent No.: US 11,025,644 B2
(45) Date of Patent: *Jun. 1, 2021

(54) DATA VERIFICATION VIA INDEPENDENT PROCESSORS OF A DEVICE (71) Applicant: Apple Inc., Cupertino, CA (US)

(72) Inventors: Gianpaolo Fasoli, Redwood City, CA (US); Matthew C. Byington, Sunnyvale, CA (US); Christopher Sharp, San Jose, CA (US); Anton K. Diederich, Mountain View, CA (US); Nicholas J. Shearer, San Francisco, CA (US); Roberto G. Yepez, San Francisco, CA (US); Petr Kostka, Cupertino, CA (US); Gianluca Barbieri, San Jose, CA (US); Abhinav Gupta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/509,412

(22) Filed: Jul. 11, 2019

(65) Prior Publication Data
US 2019/0334925 A1 Oct. 31, 2019

Related U.S. Application Data (63) Continuation of application No. 15/256,959, filed on Sep. 6, 2016, now Pat. No. 10,389,733.

(51) Int. Cl.
*H04L 29/06* (2006.01)
*G06F 21/74* (2013.01)
(Continued)

(52) U.S. Cl.
CPC .......... *H04L 63/123* (2013.01); *G06F 21/74* (2013.01); *G06F 21/84* (2013.01); *H04L 63/166* (2013.01); *H04L 67/10* (2013.01)

(58) Field of Classification Search
CPC ..... H04L 63/123; H04L 63/166; G06F 21/74; G06F 21/84
See application file for complete search history.

(56) References Cited

U.S. PATENT DOCUMENTS 6,018,724 A * 1/2000 Arent ................... G06F 21/645
705/39
7,024,691 B1 4/2006 Herzberg et al.
(Continued)

FOREIGN PATENT DOCUMENTS

| CN | 102339194 A | 2/2012 |
| CN | 103996117 A | 8/2014 |

(Continued)

OTHER PUBLICATIONS

Li, Wenhao, et al. "Adattester: Secure online mobile advertisement attestation using trustzone." Proceedings of the 13th annual international conference on mobile systems, applications, and services. 2015, pp. 75-88. (Year: 2015).*

(Continued)

*Primary Examiner* — Kari L Schmidt
(74) *Attorney, Agent, or Firm* — Kilpatrick Townsend and Stockton LLP (57) ABSTRACT

A content request communication, e.g., generated using a first processor of a device, can be transmitted to a web server. A response communication including content identifying a first value can be received from the web server. The first processor can facilitate presentation of the content on a first display of the device. A communication can be received at a second processor of the device from a remote server. The communication can include data representing a second value and can be generated at the remote server using information received from the web server. Further, the second processor can produce a secure verification output that can be presented on a separate, second display, representing at least the (Continued)

second value. The presentation on first display can at least partially overlap in time with the presentation on the second display.

20 Claims, 5 Drawing Sheets

(51) Int. Cl.
    *G06F 21/84*     (2013.01)
    *H04L 29/08*     (2006.01)

(56) References Cited

U.S. PATENT DOCUMENTS

| | | |
|---|---|---|
| 7,266,693 B1 | 9/2007 | Potter et al. |
| 8,170,932 B1 | 5/2012 | Krakowiecki et al. |
| 8,261,064 B2 | 9/2012 | Ditzman et al. |
| 8,667,573 B2 | 3/2014 | Lawrence et al. |
| 8,924,309 B2 | 12/2014 | Hamid et al. |
| 9,444,630 B2 | 9/2016 | Sauve et al. |
| 9,853,977 B1 | 12/2017 | Laucius et al. |
| 2003/0023878 A1 | 1/2003 | Rosenberg et al. |
| 2009/0049301 A1 | 2/2009 | Hamid et al. |
| 2009/0254986 A1 | 10/2009 | Harris et al. |
| 2010/0327054 A1 | 12/2010 | Hammad |
| 2011/0138464 A1 | 6/2011 | Ohta et al. |
| 2012/0062443 A1 | 3/2012 | Baldischweiler |
| 2012/0226582 A1 | 9/2012 | Hammad |
| 2013/0113681 A1 | 5/2013 | Zhang |
| 2014/0184471 A1 | 7/2014 | Martynov et al. |
| 2014/0373093 A1 | 12/2014 | Wood et al. |
| 2015/0046336 A1 | 2/2015 | Cummins |
| 2015/0120574 A1 | 4/2015 | Xia |
| 2015/0324615 A1 | 11/2015 | Matsumoto et al. |
| 2016/0371046 A1 | 12/2016 | Komiyama et al. |
| 2018/0069871 A1 | 3/2018 | Fasoli et al. |
| 2018/0114010 A1* | 4/2018 | Van Os .............. G06F 3/03547 |
| 2018/0146016 A1 | 5/2018 | Lieb |

FOREIGN PATENT DOCUMENTS

| | | |
|---|---|---|
| CN | 107798537 A | 3/2018 |
| EP | 2 942 746 A1 | 11/2015 |
| JP | 2006221633 A | 8/2006 |
| KR | 20060085696 A | 7/2006 |
| WO | 2009/017663 A1 | 2/2009 |
| WO | 2009/018663 A1 | 12/2009 |

OTHER PUBLICATIONS

A. Hiltgen, T. Kramp and T. Weigold, "Secure Internet banking authentication," in IEEE Security & Privacy, vol. 4, No. 2, pp. 21-29, Mar.-Apr. 2006, (Year: 2006).*

"Decision to Grant a European Patent Pursuant to Article 97(1) EPC," dated Oct. 1, 2020 in European Patent Application No. 17183941.8-1218 / 3291126. 2 pages.

"Notification of the First Office Action," dated Jan. 13, 2021 in Chinese Patent Application No. 201710766972.5. 25 pages (includes English translation).

Notice of Allowance dated Aug. 22, 2019 in Korean Patent Application No. 10-2017-0102968. 9 pages, includes English translation of the allowed claims.

European Search Report dated Nov. 30, 2017 in Application No./ Patent No. 17183941.8-1870. 8 pages.

Notice of Preliminary Rejection dated Feb. 7, 2019 in Korean Application No. 10-2017-0102968. 13 pages, includes English translation.

Dhamija, Rachna et al., "The Battle Against Phishing: Dynamic Security Skins." Proceedings of the 2005 ACM Symposium on Usable Security and Privacy, ACM International Conference Proceedings Series, ACM Press. Jul. 2005. pp. 77-88.

Herzberg, Amir et al., "Protecting (even) Naïve Web Users, or: Preventing Spoofing and Establishing Credentials of Web Sites." Computer Science Department, Bar Ilan University. Jul. 18, 2004. 26 pages.

First Action Interview Office Action Summary, dated Aug. 3, 2018 in U.S. Appl. No. 15/256,959. 9 pages.

First Action Interview Pilot Program Pre-Interview Communication, dated May 21, 2018 in U.S. Appl. No. 15/256,959. 7 pages.

Final Office Action, dated Dec. 27, 2018 in U.S. Appl. No. 15/256,959. 42 pages.

Notice of Allowance, dated Apr. 3, 2019 in U.S. Appl. No. 15/256,959. 13 pages.

Wu, Min et al., "Do Security Toolbars Actually Prevent Phishing Attacks?" MIT Computer Science and Artificial Intelligence Lab, Cambridge, MA. 2006. 10 pages.

Wu, Min et al., "Effective Defense Schemes for Phishing Attacks on Mobile Computing Platforms." IEEE Transactions on Vehicular Technology. vol. 65, Issue 8. pp. 6678-6691. Aug. 2016.

Oat et al., "MoCHA: Augmenting Pervasive Displays Through Mobile Devices and Web-Based Technologies." IEEE International Conference on Pervasive Computing and Communication Workshops (Percom Workshops), Budapest Proceedings. pp. 506-511. 2014.

\* cited by examiner

DATA VERIFICATION VIA INDEPENDENT PROCESSORS OF A DEVICE

CROSS-REFERENCES TO RELATED APPLICATIONS

This application claims the benefit of U.S. Non-Provisional application Ser. No. 15/256,959, filed Sep. 5, 2016, entitled "DATA VERIFICATION VIA INDEPENDENT PROCESSORS OF A DEVICE." The disclosure of this application is hereby incorporated by reference herein in its entirety for all purposes.

FIELD

The present disclosure relates generally to systems and methods for facilitating information security via verification of data, including to each of multiple processors of a device independently receiving and processing a different signal to facilitate display of a presentation at a processor-controlled display, where each signal represents one or more corresponding pieces of data.

BACKGROUND

The rise in digital advancements has been, unfortunately, accompanied by a proliferation in malware, spoofing, phishing and other cybersecurity threats. For example, link manipulation and/or website forgery can cause a user to believe that a given webpage is associated with a trusted source, while in reality, it can be hosted by another entity that is attempting to gain access to data associated with user. The webpage can include one or more fields that request input from a user. The fields can be associated with field descriptors and/or information that can falsely identify or imply how the data is to be used. Users can then be tricked into providing the other entity with access to sensitive data. Thus, techniques that facilitate determining whether presented descriptors and/or information are accurate can improve cybersecurity.

SUMMARY

In some embodiments, an electronic device is provided. The electronic device can include a first output component, e.g., a display configured to output visual stimuli and a second output component, e.g., a display configured to output visual stimuli. The electronic device can include one or more first processors coupled (communicatively) to the first output component and one or more second processors coupled (communicatively) to the second output component. The one or more second processors can be separate from the one or more first processors. The electronic device can include a first computer-readable storage medium containing first instructions, that, when executed by the one or more first processors, cause the one or more first processors to perform first actions. The first actions can include transmitting a content request communication from the electronic device to a web server and receiving a response communication from the web server, the response communication including content identifying a first value. The first actions can also include facilitating a first presentation of the content at the first output component, e.g., the first display. The electronic device can include a second computer-readable storage medium containing second instructions, that, when executed by the one or more second processors, cause the one or more second processors to perform second actions.

The second actions can include receiving a communication from a remote server including data representing a second value. The communication can include one that has been generated at the remote server in response to receipt of first instructions or another communication from the web server. The second actions can also include generating a secure verification output including the second value. The second actions can further include facilitating a second presentation of the secure verification output at the second display such that the second presentation of the verification output overlaps in time with the first presentation of the content. The second display can be separate from the first display.

In some embodiments, methods can be provided for using multiple processors on a device to generate a verification output based on web server communications. A content request communication can be transmitted to a web server using a first processor of the device. A response communication can be received from the web server. The response communication can include content identifying a first value. A first presentation of the content on a first display of the device can be facilitated using the first processor. A communication can be received at a second processor of the device from a remote server, separate from the web server. The communication can include data representing a second value. The communication can include one generated at the remote server in response to receipt of another communication from the web server. The second processor can be separate from the first processor. A secure verification output comprising the second value can be generated using the second processor. A second presentation can be facilitated using the second processor. The second presentation can include the secure verification output and can be presented at the second display such that the second presentation of the verification output overlaps in time with the first presentation of the content. The second display can be separate from the first display.

In some embodiments, an electronic device is provided that can include a first display configured to output visual stimuli and a second display configured to output visual stimuli. The electronic device can also include one or more first processors coupled to the first output component and one or more second processors coupled to the second output component and separate from the one or more first processors. The electronic device can also include a first computer-readable storage medium containing first instructions, that, when executed by the one or more first processors, cause the one or more first processors to perform first actions. The first actions can include receiving, from a web server, a first communication that includes transaction data and facilitating a first presentation of the transaction information at the first display. The electronic device can further include a second computer-readable storage medium containing second instructions, that, when executed by the one or more second processors, cause the one or more second processors to perform second actions. The second actions can include receiving, from a validation server, a second communication that includes validation data and facilitating a second presentation at the second display that includes validation information that is based on the validation data. The validation information can be related to the transaction information. The presentation of the transaction information can overlap in time with the presentation of the validation information.

The following detailed description together with the accompanying drawings will provide a better understanding of the nature and advantages of the present disclosure.

DETAILED DESCRIPTION

In some embodiments, physical architecture can be configured such that a first (e.g., primary) operating system can be executed by a first processor of a device and a separate, secure operating system can be executed by a second processor of the device. The first processor can control output of first data to a first display of the device, and the second processor can control output of second data to a second display of the device. In some instances, the first display can be configured such that presentations at the first display cannot be controlled, initiated and/or modified by the second processor, and/or the second display can be configured such that presentations at the second display cannot be controlled, initiated and/or modified by the first processor. As such, in some implementations, a display, e.g., the second display, can be controlled solely by the corresponding processor, e.g., the second processor. The first data and the second data can pertain to and/or include same, similar, or related content.

Whether at least part of the first data matches and/or corresponds with at least part of the second data can then be used to determine whether a source (e.g., that can be hosting a webpage and/or requesting information) of the first data and/or second data is to be trusted and/or is authentic. In some instances, each of the first data and the second data can include information identifying any/all of a value (e.g., cost), a date, and/or a destination name (e.g., merchant) for a potential transaction to occur via a website. The integrity of the site or potential transaction can then be assessed based on whether the information presented at the first display matches, or is otherwise consistent with, information presented at the second display.

The first data can include and/or have been derived based on data received at the device from a web server (or other first source), the second data can include and/or have been derived based on data received at the device from a verification server (or other second source). Transmissions from the first and second sources can be coordinated, in that a communication from the web server to the verification server can trigger a transmission from the verification server to the device. Data received from the verification server can be signed, and the second processor can validate the signature prior to displaying the second data or using the second data to render displayable information. In some instances, what and/or whether data is displayed at the second display depends on whether the signature is validated (e.g., such that a warning indication is presented when the signature is not validated and at least part of the second data is presented, or used to generate presented information, when the signature is validated). Further or additional validation can be performed at the verification server before and/or after the device receives the second data from the verification server.

Embodiments disclosed herein provide a variety of useful inter-device transaction coordination capabilities and advantages. For example, at least some embodiments disclosed herein can promote security of communications. Communications between a web server and remote server can identify data at least partly defining a proposed action (or transaction), such as an associated value and/or destination. A remote server, such as a verification server, can at least partly control whether the proposed action will be completed. Communications from a remote server to a user device that reflect such data can thus be trusted to reflect accurate indications as to one or more parameters of the proposed action. Thus, the three-way communication exchange between a remote server (e.g., a validation server) that at least partly controls whether the proposed action will be completed, a web server that least partly defines a proposed action, and a user device that controls whether to perform the proposed action can promote communication of accurate information to the user device.

Configuring a user device to include multiple processors (e.g., that execute different instances of one or more operating systems) can further promote device security. For example, traditionally, various user devices may be configured such that modified web content was displayed or such that communications were transmitted to a malicious destination. Various implementations disclosed herein can operate to reduce or inhibit these security risks. More specifically, in some embodiments, at least a portion of the data corresponding to a proposed action is transmitted (e.g., from multiple servers) to two separate processors of a device. Thus, even if one processor is compromised in a manner that alters presentations of parameters associated with a proposed action, another independent processor on the device may not be similarly affected. Thus, respective presentations controlled by the separate processors can be assessed to determine whether data presented on one display of the device can be verified by, or is otherwise consistent with, data presented on another display of the device. Presentations on separate displays of a device (e.g., a user device) can further enhance this type of verification security.

As one particular illustration, a first processor at a user computer device can send and receive HTTP communications to facilitate presentations of webpages (at a first primary display) at the user computer device. One such webpage can include data that indicates that Product A is being offered by Company B (that is also hosting the webpage) for purchase for Amount X. The webpage may include a button that corresponds to a request to electronically purchase Product A. When a user clicks on the button, the user computer device may transmit an indication that the button was selected to the web server. The web server may have been registered with a remote server that manages payment information for an account associated with the user computer device. The web server can then transmit transaction data that identifies Amount X and an account of Company B to the remote server. The remote server can generate image data that identifies Amount X and Company B and can transmit the image data to the user computer device. A second processor at the user computer device can detect the image data and cause an image identify Amount X and Company B to be presented at a second display corresponding to a digital function row. The image can be presented at a time during which the webpage is still displayed, so as to allow a user to determine whether the preliminary transaction data as identified in the image corresponds to (e.g., matches) that as identified in the webpage. In an instance where the data correspondence is not present, a security issue may be recognized by a user, such that a user may decide not to proceed with a potential transaction.

Figure 1:
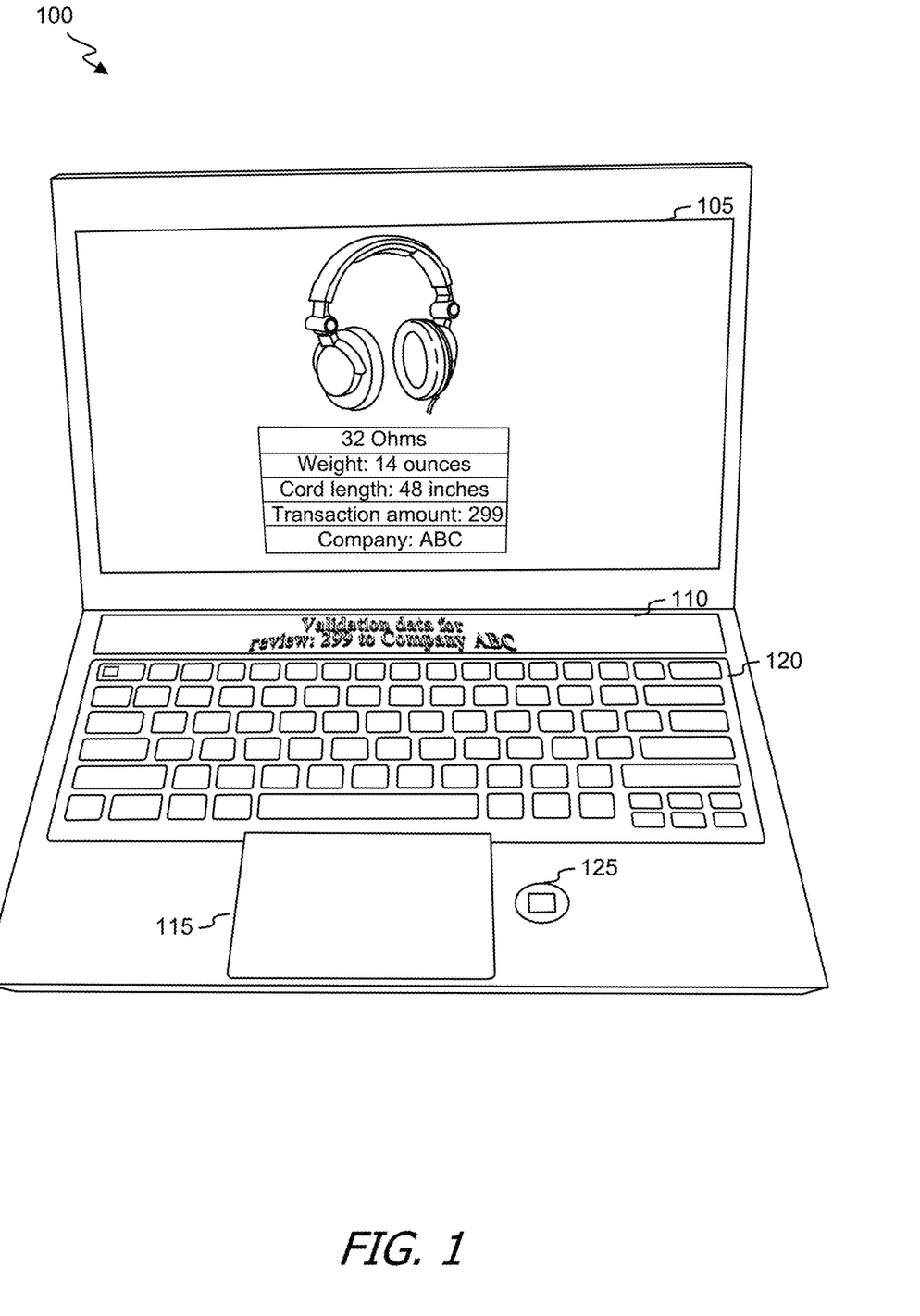
FIG. 1 shows an example of an electronic device that includes multiple displays for presenting corresponding data.

FIG. 1 shows an example of a user device 100 that includes multiple displays for presenting corresponding data that can be indicative of a degree of information security. In the depicted instance, user device 100 is a laptop computer, but can be implemented as any device having multiple outputs, of which one is configured as a secure output. User device 100 includes multiple displays, including a first display 105 and a second display 110.

First display 105 can be controlled (e.g., at least in part) by a first processor (not shown) of user device 100. First display 105 can be configured (for example) to display content from one or more applications or programs being executed, at least in part, by the first processor. An exemplary application or program can include a web browser, such as Safari, Chrome, Firefox, or Explorer. An application can be configured to facilitate transmission and receipt of communications (e.g., to and from a web server) and to present content included in or generated based on received communications.

User device 100 can include one or more input components, such as a trackpad 115, a keyboard 120, a mouse, etc. that receive user input. Input received through one or more input components can be used, for example, by an application or program to identify interactions with content presented at first display 105 and/or to determine how such content is to be modified. For example, an application can use input to generate and trigger transmission of one or more requests to a web server.

Some communications from user device 100 can cause a web server to transmit data to a remote server (e.g., that at least partly controls whether, when and/or how an action is to occur, such as a charge or transfer action between accounts). The communications can include one or more parameters that define an action, such as a destination and/or value of a transfer.

A different application or program (or in some implementations the same application/program) on user device 100 can be configured to receive one or more communications from the remote server. The one or more communications from the remote server can include the one or more parameters and/or an indication as to whether the web server is authentic, identified in a white-list data store, is associated with white-listed characteristics (e.g., location, destination location, request frequency, etc.) and/or other such indications of trust.

User device 100 can generate information to be presented based at least in part on the communication(s) from the remote server. The information to be presented can include the one or more parameters (which can correspond to one or more parameters represented at first display 105) and/or any/all of an indication as to whether the data received from the web server and/or the web server has been authenticated, is verifiable, is of an approved format, and so on. Thus, in some instances, the information to be presented can include information that is to correspond to and/or at least partly match information presented at first display 105.

The other information to be presented can be displayed on second display 110, such that a user can concurrently view a first presentation of information on first display 105 generated based on a communication from a web server and a second presentation of information on second display 110 generated based on a communication from the remote (e.g., verification) server. The information presented on first display 105 and second display 110 can then be compared to determine whether it corresponds, matches, or is otherwise consistent. Thus, a user can understand that a particular validation indication, e.g., associated with information on the second display 110 pertains to the first presentation of information on the first display 105.

Second display 110 can be controlled (e.g., at least in part) by a second processor (not shown) of user device 100. Accordingly, control of second display 110 can be independent of the first processor of user device 100, so that if the first processor (or information processed by or otherwise output therefrom) is manipulated or otherwise compromised, the presentation of information on second display 110 will remain unaffected. In some implementations, the second processor can be a secure processor. Second display 110 can be separate from first display 105, e.g., located adjacent to a standard keyboard on the device. Second display 110 can include, for example, a virtual keyboard or digital function row that includes a touchscreen. Second display 110 can be configured to, at least some of the time, present one or more input options that can be selected via touch of an option. The one or more input options can include, for example, one or more functions (e.g., F1, F2, etc.) and/or screen input/output controls (e.g., brightness of a first display, volume of speakers, etc.). Second display 110 can be configured such that presentations at the display can change in time (e.g., in response to user input detected at the second display or other input component and/or in response to an instruction of an application being executed at the second processor). Thus, the dynamic function row display can present context-relevant information, including information associated with a transaction or other such action that is in process.

User device 100 also includes a touch identification (ID) reader 125. In some implementations, Touch ID reader 125 can be implemented as a separate component. In other implementations, Touch ID reader 125 can be implemented as part of second display 110, e.g., a dynamic function row display. Touch ID reader 125 can be configured to detect when a user is placing his or her finger over the reader. For example, a sensor can be configured to be activated when a capacitive signal (e.g., that is above a defined threshold) is detected (e.g., using multiple electrodes). As another example, a switch can be configured to detect a depression or force. Upon detecting a user's finger, touch ID reader 125 can capture an image of the user's finger. The image can then be aligned in accordance with one or more alignment techniques (e.g., to a standard axis based on curvature in fingerprint lines) and compared to each of one or more stored fingerprints of a user (or processed version thereof). Thus, it can be estimated whether a finger corresponds to a fingerprint of a particular user.

Touch ID reader 125 can act in cooperation with a processor. For example, a processor can perform the alignment and comparison actions. In some implementations, the processor associated with touch ID reader 125 can be the processor (e.g., secure processor) that controls second display 110 and/or a secure data store (e.g., in a secure element and/or with restricted access). In some instances, after one or more conditions are satisfied (e.g., a processor detects validation content from the remote server and a recognized fingerprint), the processor sends an instruction signal for transaction information (e.g., a Device Account Number; token specific to an account, user and/or device; credit or debit card number; or other account identifier) to be released from the secure data store and transmitted (e.g., to the web server or remote server).

While the depicted instance shows user device 100 as being a laptop computer, it will be appreciated that user device can include other types of electronic devices, such as a desktop computer, smart phone, tablet, wearable computer, set-top box, or any other such computing device. In some instances, a system of multiple devices (e.g., connected to each other via a wired or wireless connection) can be used. A system can include (for example) at least two devices. The system can include at least two presentation components (e.g., display, speakers or haptic component) and at least two processing components. For example, each of multiple devices can include a display and processor. As another example, a first device can include a first display, first processor, and either a second display or second processor, and a second device can include the other of the second display or second processor. As one illustration, a first device can include a tablet, laptop, or desktop computer, and a second device can include an electronic wearable device, accessory, or smart phone.

Further, it will be appreciated that the information to be presented on second display 110 can instead or additionally be presented using a different type of output component. For example, a type of audio stimulus can identify whether web content is from a known source, and/or an audio stimulus can include spoken word that identifies one or more parameters, e.g., a value, associated with a potential transaction. As another example, a haptic or force output can be presented when the remote server determines that a communication from a web server includes suspicious content or metadata, such as including a parameter, e.g., a value, that deviates from a defined threshold or expected value, such as identifying a destination that is outside of a country where user device 100 is located.

Figure 2:
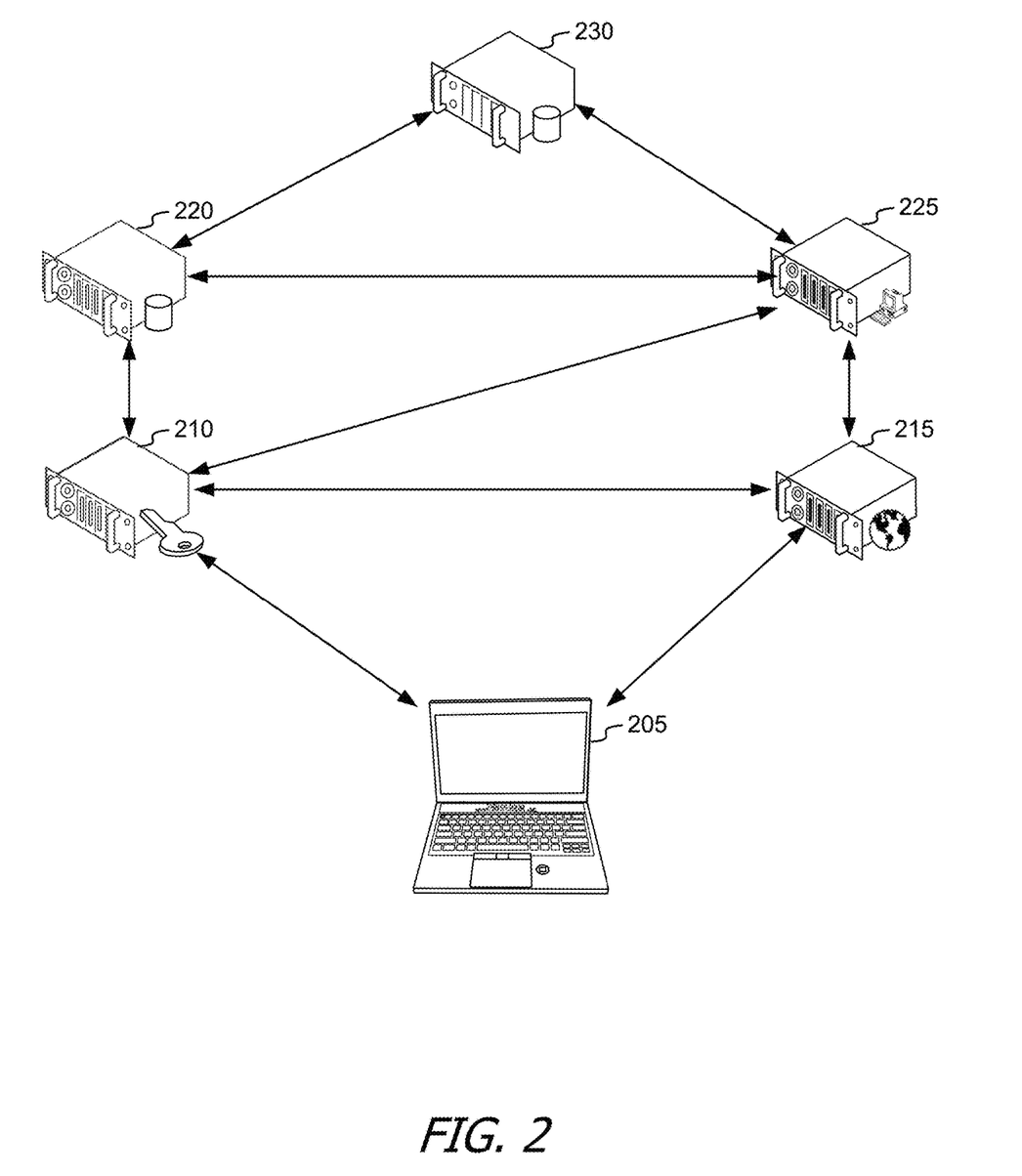
FIG. 2 illustrates an example network including a device and multiple servers that facilitate transmission to the device.

FIG. 2 illustrates a network including a device and multiple servers that facilitate coordinated transmission to the device. The illustrated components can communicate over one or more networks. For example, two or more components can communicate over a wired or wireless (e.g., WiFi or cellular) network.

In the depicted instance, a user device 205 is in communication with a remote server 210 and a web server 215. User device 205 can collect information that identifies an account. For example, alphanumeric inputs can be typed and/or a camera on user device 205 can capture an image that identifies a number and expiration date of a payment credential, such as a credit card. User device 205 can transmit the information, or a representation thereof, to remote server 210.

Remote server 210 can then identify an identifier or token associated with the account. As one example, remote server 210 can generate the identifier or token (e.g., using a cryptographic, pseudo-random or other technique). Remote server 210 can transmit the identifier or token and at least part of the information to a user account management system 220 (e.g., a system of a bank associated with the user account). User account management system 220 can then identify an account associated with the at least part of the information and associate the account with the identifier or token. As another example, remote server 210 can transmit a request for the identifier or token to user account management system 220 that includes at least part of the information. User account management system 220 can then generate the identifier or token (e.g., using a cryptographic, pseudo-random or other technique), store an association between the identifier or token and the user account, and transmit the identifier or token to remote server 210.

Remote server 210 can transmit the identifier or token for the account to user device 205, which can store the identifier or token as secure information in a secure data store (e.g., secure element) of the device. In some instances, remote server 210 can encrypt the identifier or token prior to sending it to user device 205 and/or user device 205 can store the identifier or token in an encrypted format.

Remote server 210 can further communicate with processing system 225, which can manage transactions associated with a web site hosted by web server 215. Processing system 225 can send a request to remote server 210 for a certificate, key (e.g., private cryptographic key) or other data element. Remote server 210 can generate and sign the certificate, key, or data element. The certificate or data element can uniquely identify processing system 225 (or associated entity) from amongst other systems and/or entities. Remote server 210 can transmit a key and/or signed certificate or data element to processing system 225 in one or more communications. In some instances, generation of the signed certificate or data element and/or transmission of the key and/or signed certificate or data element can be conditioned, such as conditioned upon whether an IP address is of a trusted format, whether the request is associated with metadata of a trusted format, whether the request is associated with an established or new account, and so on.

User device 205 can transmit a request for web content (e.g., an http request) to web server 215, and web server 215 can transmit web content (e.g., via transmission of an http response) to user device 205. User device 205 can present the web content on a first display of user device 205.

Web server 215 can detect that particular content corresponds to a potential transaction and transmit data corresponding to the potential transaction to remote server 210. The data can include, for example, one or more parameters (e.g., a destination and value) associated with the potential transaction, such as a name or identifier of an entity to which a payment would be delivered (e.g., an identifier that is associated with a website and/or processing system 225), an amount of the payment, and/or an identifier of user device 205 (e.g., an IP address). As one example, the data can identify a bank and account to which a payment would be delivered if authorized and an amount of the potential payment. Alternatively, remote server 210 can obtain data corresponding to the potential transaction through other means, such as actively requesting the data from web server 215.

Remote server 210 can generate a secure verification output based on the data. The secure verification output can, for example, indicate whether the destination matches or corresponds to any issued certificate or other data element. For example, a secure verification output can be generated only when such a match or correspondence is identified, or the secure verification output can be differentially generated such that one or more aspects of the output identify whether the match or correspondence is identified. The secure verification output can also or alternatively identify one or more parameters (e.g., a destination, time, and/or transaction value) identified in the data received from the web server, which can be used for verification/validation.

In some instances, remote server 210 first determines whether the destination matches or corresponds to any issued certificate or other data element. If no match or correspondence is identified, a rejection communication can be generated and transmitted to web server 215. If a match or correspondence is identified, remote server 210 can generate and sign an image that includes an identification of the destination and the value. Additionally or alternatively, remote server 210 can generate and sign data representing one or more parameters associated with the transaction. Remote server 210 can transmit the signed image to user device 205. User device 205 can present the signed image (and/or other transaction-related information) on a second display of user device 205. The concurrent presentation of the web content and signed image can enable a user to determine that the proposed transaction is associated with a trusted merchant and to determine whether details presented in the web content about the proposed transaction match those represented in the signed image.

User device 205 can detect one or more inputs that authorize the proposed transaction. The detection can include, for example, detecting that touch input received by a touch ID reader of the device matches a fingerprint profile. User device 205 can then retrieve secure information from the secure data store and send the secure information to web server 215 (or other server associated with the transaction). Web server 215 can then use a key (e.g., a private key having been received from remote server 210) to decrypt the secure information. Web server 215 can then transmit the decrypted secure information to processing system 225.

Processing system 225 can transmit the decrypted secure information to remote server 210 along with one or more transaction parameters (e.g., identifying a destination and/or value) and a certificate and/or other data element that uniquely identifies processing system 225 or associated entity. Processing system 225 can further include additional information that indicates that the communication corresponds to a same session as one for which the secure verification output was previously generated. For example, the additional information can include a web page or web site identifier or associated data (e.g., a domain name or a fully qualified domain name), session identifier, and/or user IP address. Remote server 210 can use the additional information to retrieve one or more parameters previously received in association with a same session. Remote server 210 can determine whether the retrieved one or more parameters match those provided with the currently provided one or more transaction parameters. If the parameters do not match, remote server 210 can send a communication to processing system 225 that rejects the transaction.

If a match is detected, remote server 210 can transmit one or more communications to user account management system 220. The one or more communications can include at least part of the decrypted secure information or a processed version thereof and the one or more transaction parameters. User account management system 220 can then communicate with a merchant account management system to transfer the value identified in the one or more transaction parameters from the user account to an account identified as the destination (e.g., merchant account). User account management system 220 can transmit a communication to remote server 210 as to whether the transfer was successful, and remote server 210 can similarly provide such information to user device 205, processing system 225 (which can then transmit the information to web server) and/or web server 215, such that an indication can be presented (e.g., on a first and/or second display) at user device that indicates whether the transfer was completed.

Figure 3:
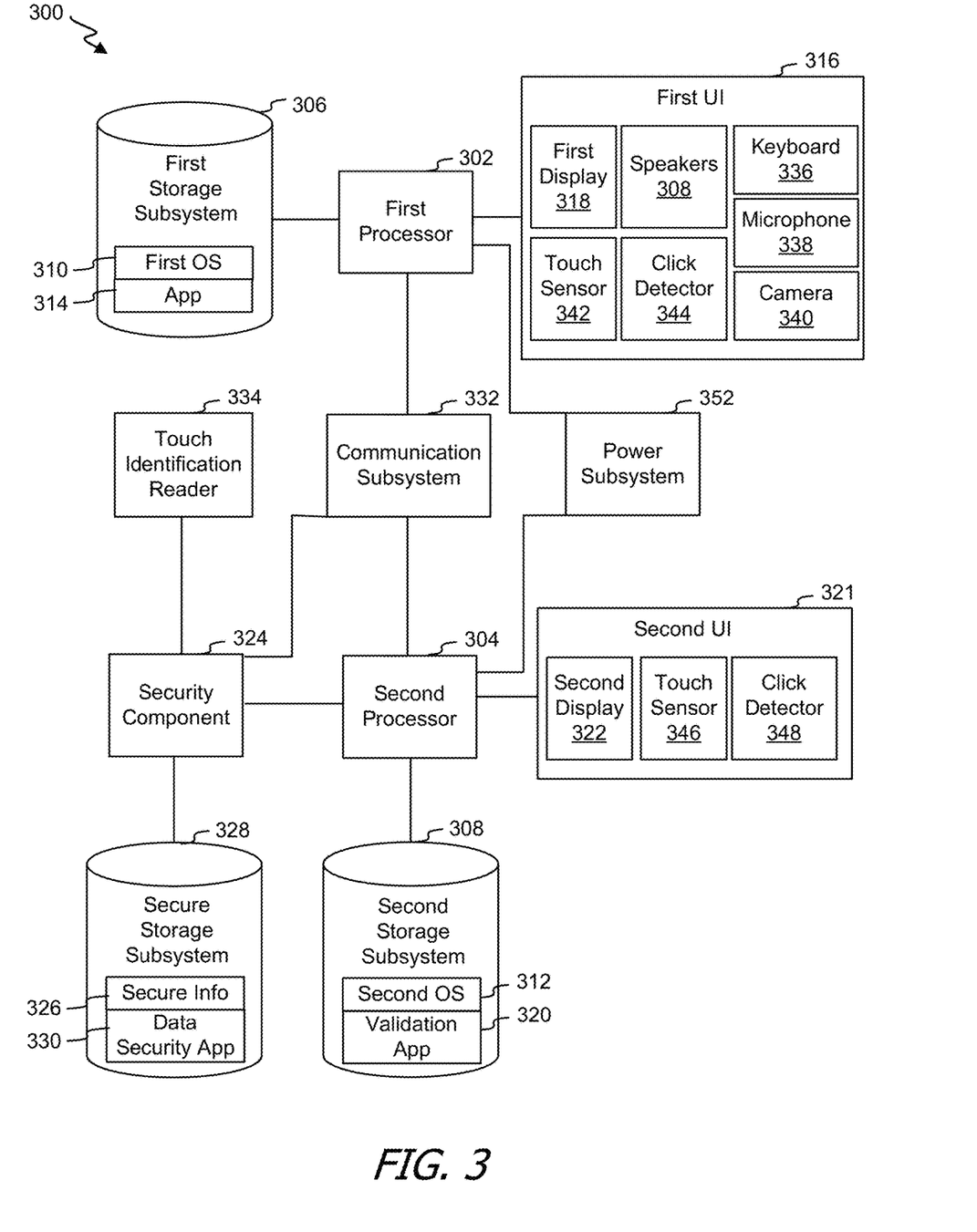
FIG. 3 is a block diagram of an example device.

FIG. 3 is a block diagram of an example user device 300. User device 300 includes a first processor 302 and a second processor 304. Either or both of first processor 302 and second processor 304 can be, or can include, one or more of: a microprocessor, a central processing unit (CPU), a general purpose processor (GPU), an application-specific integrated circuit (ASIC), a programmable logic device (PLD), a field-programmable gate array (FPGA), a digital signal processor (DSP), a secure processor, or combinations of such devices. Either or both of first processor 302 and second processor 304 can be or include a single-core or multi-core microprocessor. As described herein, the term "processor" is meant to encompass a single processor or processing unit, multiple processors, multiple processing units, or other suitably configured computing element or elements. In operation, each of first processor 302 and second processor 304 can control the operation of part of user device 300. In various embodiments, first processor 302 and/or second processor 304 can execute a variety of programs in response to program code and can maintain multiple concurrently executing programs or processes.

First processor 302 can be separate from second processor 304, which can correspond to (for example) being physically separate components, physically separated within the user device, not directly connected to each other, and/or not being functionally connected to each other such that an operation of one of the processors would not affect an operation of the other of the processors.

Data from a first storage subsystem 306 can be accessible to and used by first processor 302, and data from a second storage subsystem 308 can be accessible to and used by second processor 304. In some instances, each of first storage subsystem 306 and second storage subsystem 308 includes a separate (e.g., physically distinct) storage component. In some instances, each of first storage subsystem 306 and second storage subsystem 308 includes a different partition of a single storage component. Either or both of first storage subsystem 306 and second storage subsystem 308 can be implemented, e.g., using magnetic storage media, flash memory, other semiconductor memory (e.g., DRAM, SRAM), or any other non-transitory storage medium, or a combination of media, and can include volatile and/or non-volatile media.

Through suitable programming, first processor 302 and/or second processor 304 can provide various functionality for user device 300. First processor 302 can execute a first operating system (OS) 310, e.g., stored in first storage subsystem 306, and second processor 304 can execute a second OS 312, e.g., stored in second storage subsystem 308. First OS 310 can be a same type or different type of OS than second OS 312.

Further, first processor 302 can execute one or more applications 314, such as a browser application, app, email application, messaging application, and/or word processor application. At least one application of one or more applications 314 can be configured to (when executed) at least partly control information presented at a first user interface (UI) 316 (e.g., a first display 318 at first UI 316). Second processor 304 can further execute one or more applications, which can include a validation app 320. Validation app 320 can be configured to at least partly control information presented at a second UI 321 (e.g., a second display 322 at second UI 321). For example, validation app 320 can be configured to receive a signed image (or other such validation information) from a particular source (e.g., remote server), verify the signature and present the image at second display 322. In some instances, at least one application that is configured for execution on one of first processor 302 and second processor 304 is not configured for execution on the other processor. For example, in some instances, first processor 302 may be configured to execute a browser application or one or more other user applications (apps) that a user can download, while second processor 304 may not be configured to execute such applications. Such differences may be effected due to (for example) second storage subsystem 308 lacking an initial application and/or having restricted or no access for allowing a user to download (or otherwise generate or store) applications to the storage subsystem.

One or more applications (e.g., app 314 and/or validation app 320) can operate to perform part of a technique described herein. For example, a browser application storage at first storage subsystem 306 and validation app 320 can be concurrently (or sequentially) operated so as to present first data with one or more transaction parameters on a webpage presented using a browser at first display 318 and to present second data at second display 322. The second data can indicate whether the one or more transaction parameters presented on the webpage at first display 318 actually reflect those being identified to a remote server for a potential transaction. For example, any/all of a transaction amount, party, currency, etc. presented on the web page at first display 318 can be compared with the second data presented at second display 322 to determine whether there is consistency or discrepancy in the data.

User device 300 can include a security component 324 that controls access to secure information 326 stored at a secure storage subsystem 328. Secure storage subsystem 328 can be implemented, e.g., using magnetic storage media, flash memory, other semiconductor memory (e.g., DRAM, SRAM), or any other non-transitory storage medium, or a combination of media, and can include volatile and/or non-volatile media.

Security component 324 can be configured to, for example, execute a data security application 330 that determines whether a condition has been satisfied and only retrieves and provides for access (e.g., via decrypting the secure information and/or sending the information to another component of user device 300, such as a communication subsystem 332) to part or all of secure information 326 (e.g., encrypted secure information, which can include an account identifier) when the condition is satisfied. For example, a condition can include having received an indication from second processor 304 that signed data has been received from a remote server and also detecting a particular type of user input corresponding to a request or instruction to release data. Detecting the particular type of user input can include (for example) detecting that a user is engaging (e.g., touching or placing a finger above or near) a touch identification reader 334 (e.g., which can include a pressure, capacitive, or resistive detecting component/switch and/or image sensor). The detection can further include determining that user input corresponds to a particular user (e.g., via determining that one or more fingerprint characteristics match a user profile or that a voice having provided a voice command has one or more voice characteristics that match a user profile). Security component 324, in some instances, includes part or all of a chip and/or a secure element. In some implementations, security component 324 can be implemented by, integrated with, or otherwise disposed in second processor 304.

User device 300 can send and receive communications via communication subsystem 332, which can include a transmitter, receiver and/or transceiver. Communication subsystem 332 can include (for example) an antenna to wirelessly transmit and/or receive signals using a network such as a WiFi network. Communication subsystem 332 can further or alternatively be configured to support transmission and/or receipt of communications over a short-range network, such as a Bluetooth, Bluetooth Low Energy or Near Field Communication network.

Communication subsystem 332 can include (for example) a radio frequency (RF) interface that can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some embodiments, RF interface 408 can implement a Bluetooth LE (Low energy) proximity sensor that supports proximity detection through an estimation of signal strength and/or other protocols for determining proximity to another electronic device. The RF interface can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into the RF interface.

Communication subsystem 332 can also or alternatively include a connector interface that can allow user device 300 to communicate with various devices (e.g., a server or coordinating device) via a wired communication path, e.g., using Universal Serial Bus (USB), universal asynchronous receiver/transmitter (UART), or other protocols for wired data communication.

Each of first UI 316 and second UI 321 can monitor inputs received by user device 300 and/or can control outputs presented by user device 300. For example, first UI 316 can include one or more input components to receive user input, including a keyboard 336 to receive alphanumeric input selections, a microphone 338 to receive vocal or audio inputs, a camera (or image sensor) to detect visual (e.g., gesture) inputs, a touch sensor 342 to receive touch inputs (e.g., included in a track pad and/or to map particular touches or touch movements to corresponding to points or movements on first display 318) and/or click detector 344 to detect clicks (e.g., on a mouse or track pad that correspond to particular points on first display). First UI 316 also can include other types of input components, such as pressure and/or motion sensors, e.g., accelerometer and/or gyroscope. As another example, second UI 321 can also include a touch sensor 346 and click detector 348. Second UI 321 also can include other input mechanisms, including any/all of those disclosed with respect to first UI 316. Each of one, more or all input components can convert a detected stimulus to an electrical signal, such as an electrical signal that corresponds to one or more letters, words, pixels, values, or instructions.

Touch sensor 342 and/or 346 can include, e.g., a resistive and/or capacitive sensor array with the ability to localize contacts to a particular point or region on the surface of the sensor and in some instances, the ability to distinguish multiple simultaneous contacts. In some embodiments, touch sensor 342 and/or 346 can be overlaid over a corresponding display 318 and/or 322 to provide a touchscreen interface, and a corresponding processor 302 and/or 304 can translate touch events (including taps and/or other gestures made with one or more contacts) into specific user inputs depending on what is currently displayed on the display. To illustrate, one or more touch sensors can determine a location of a touch on a display. The touch sensor can be self-capacitive in certain embodiments, mutual-capacitive in others, or a combination thereof.

Click detector 344 and/or 348 can detect a click and/or depression of a button. For example, a click can be detected when an element underneath a button contacts an underlying device component to complete a circuit or when the depression of the button causes a switch to be activated or deactivated. In some instances, click detector 344 and/or 348 can detect a click and/or depression for each of a plurality of buttons and can identify which one was clicked.

Camera 340 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in first storage subsystem 306 and/or transmitted by user device 300 to other devices for storage. Depending on implementation, the optical components can provide fixed focal distance or variable focal distance; in the latter case, autofocus can be provided.

Microphone 338 can include any device that converts sound waves into electronic signals. In some embodiments, microphone 338 can be sufficiently sensitive to provide a representation of specific words spoken by a user; in other embodiments, microphone 338 can be usable to provide indications of general ambient sound levels without necessarily providing a high-quality electronic representation of specific sounds.

Each of first UI 316 and second UI 321 can also include one or more output components, such as a display (first display 318 or second display 322), speakers (e.g., speakers 350) or a haptic output (not shown). Each of one, more or all output components can convert an electrical stimulus to another type of stimulus, such as a visual, audio or haptic stimulus.

Each or both of first display 318 and second display 322 can be implemented using compact display technologies, e.g., LCD (liquid crystal display), LED (light-emitting diode), OLED (organic light-emitting diode), or the like. In some instances, first display 318 can be larger than second display 322 (e.g., in terms of area and/or along at least one dimension). For example, a height of first display 318 can be at least 2, at least 5, or at least 10 times bigger than a height of second display. In various instances, first display 318 and second display 322 are on different surfaces or a same surface of user device 300. For example, second display 322 can be located on a first surface of a laptop device that can be configured to lay flat on a support (e.g., desk, lap, table, etc.), and first display 318 can be configured to be located on a second surface of the laptop device that can be hinged to first surface and can be configured to open to a position that is angularly separated from the first surface.

In some instances, two or more of the depicted components can be integrated into a single component. For example, a touch screen can include both a display and touch sensor. In some instances, each of first processor 302 and second processor 304 can receive inputs from at least one same input component and can be configured to transmit output instructions to at least one same output component.

In some instances, execution of an app at first processor 302 can cause webpage presentations at first display 318 to change in response to detecting one or more types of inputs (e.g., one or more clicks corresponding to particular cursor positions, voice commands, or key entries). Such presentation changes can be a result of generating and transmitting webpage requests and receiving webpage data through communication subsystem 332. Communications associated with various metadata aspects (e.g., identifying a source, processor characteristic or instruction type) can be selectively routed by communication subsystem 332 to one of first processor 302 and second processor 304, or execution of particular apps or operating systems on one or both of first processor 302 and second processor 304 can cause the processor to selectively request or use communications associated with particular metadata aspects. For example, execution of validation app 320 at second processor 304 can cause second processor 304 to monitor for communications from a particular system or server and/or with metadata indicating that the communication corresponds to a validation technique. Upon detecting such a communication, the app execution can result in a signature in the communication to be verified and an image from the communication to be presented at second display.

Execution of data security app 330 at security component 324 can then monitor to determine whether touch identification reader 334 receives an input from a particular user corresponding to an instruction to transmit secure information to a source associated with the webpage. Upon detecting such input, security component 324 can retrieve part or all of secure information 326 and facilitate transmission of the part or all of the information. In some instances, secure information includes information corresponding to each of multiple accounts, and security component 324 selectively retrieves information for a single account. The single account can correspond to a default account or one identified (for example) based on user input detected by an input component at first UI 316 or second UI 321.

User device 300 can include a power subsystem 352, which can provide power and power management capabilities for user device 300. For example, power subsystem 352 can include a battery (e.g., a rechargeable battery) and associated circuitry to distribute power from the battery to other components of user device 300 that require electrical power. In some embodiments, power subsystem 352 can also include circuitry operable to charge the battery, e.g., when power or charging cord is connected to a power source. In some embodiments, power subsystem 352 can include a "wireless" charger, such as an inductive charger, to charge the battery without relying on a power or charging cord. In some embodiments, power subsystem 352 can also include other power sources, such as a solar cell, in addition to or instead of a battery.

In some embodiments, control functions of power subsystem 352 can be implemented using programmable or controllable circuits operating in response to control signals generated by first processor 302 and/or second processor 304 in response to program code executing thereon, or as a separate microprocessor or microcontroller. In some embodiments, control functions of power subsystem 352 can be based on user interaction with the device (e.g., to power down components if a device has not been interacted with in a particular manner, such as via a touch, button press or network activity, for a defined period of time).

It will be appreciated that user device 300 is illustrative and that variations and modifications are possible. For example, one or both of first UI 316 and second UI 321 can include fewer, different or additional input or output components, such as a haptic output.

Further, while user device 300 is described with reference to particular blocks, it is to be understood that these blocks are defined for convenience of description and are not intended to imply a particular physical arrangement of component parts. Further, the blocks need not (but can) correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 3 be implemented in a given embodiment of a user device.

Figure 4:
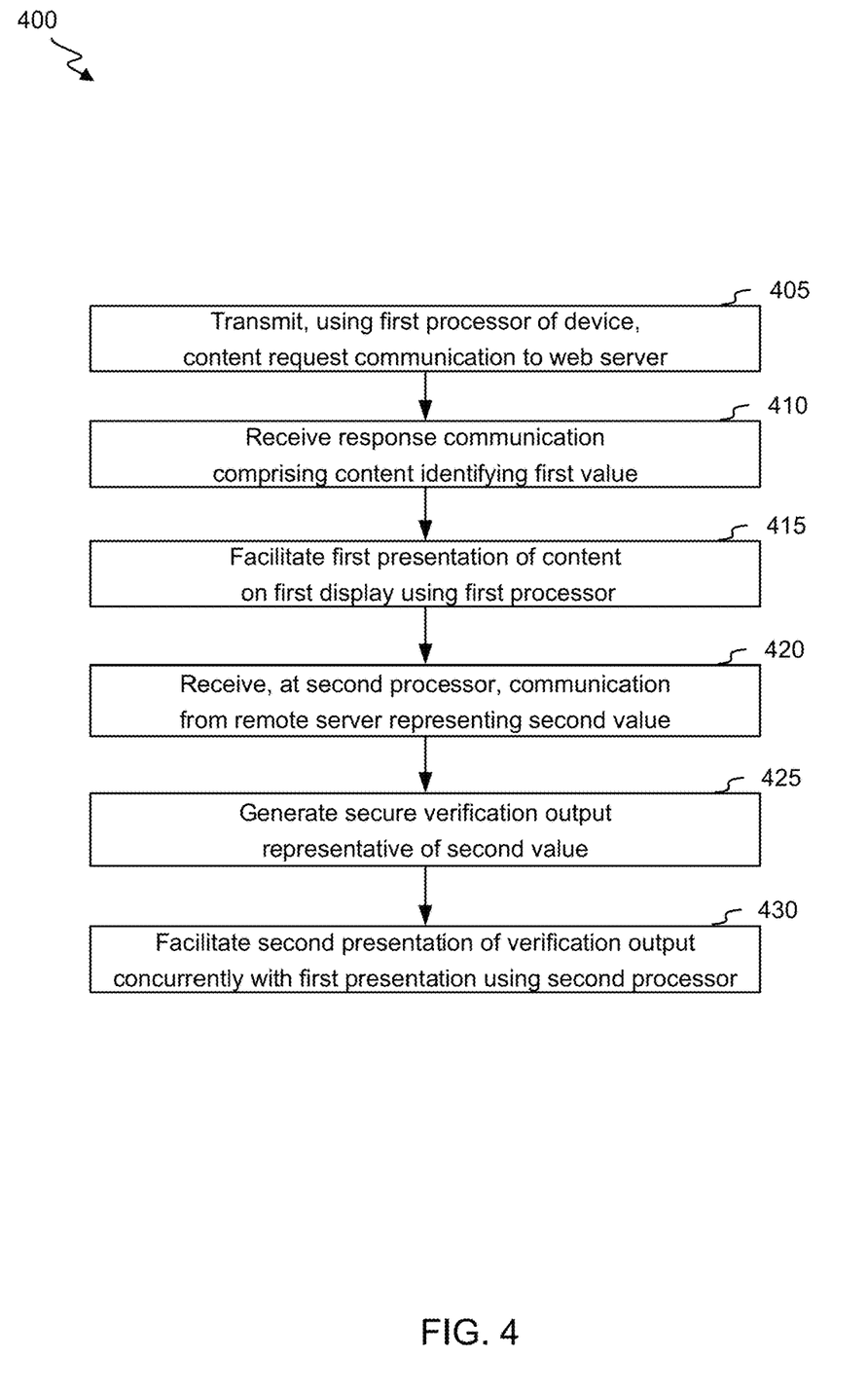
FIGS. 4 and 5 are flow diagrams of example processes for presenting verification information.

FIG. 4 is a flow diagram of an example process 400 for facilitating assessments of data integrity. Part or all of process 400 can be performed by a user device, such as user device 100, 205 or 300.

In process 400, a content request communication can be transmitted (405) from a device to a web server using a first processor of the device. For example, the first processor can generate the content request communication (e.g., via execution of a browser application) and provide the communication to a communication subsystem of the device for transmission. The content request communication can include an identifier of (for example) a web page, domain name, link, app, fully qualified domain name, etc. The content request communication can include an http request. The web server can include a server hosting a web page that corresponds to an identifier of a web page, domain name, link, fully qualified domain name included in the request.

A response communication can be received (410) at the device from the web server. The response communication can include content that corresponds to an identified web page, domain name, link, fully qualified domain name, app, etc. The content can correspond to and/or at least partly define a potential transaction. For example, the content can identify (e.g., by name, identifying alphanumeric code, picture, video, description, or other data elements) a product or service that is available, a destination name or identifier (e.g., name or identifier of an entity from which it is available), and/or a first value (e.g., price). In some instances, the content can include one or more fields to accept user input that can correspond to an instruction to initiate and/or continue the transaction, including payment and/or payment authorization data, shipping information, etc.

A first presentation (415) of the content on a first display of the device can be facilitated using the first processor. For example, using an application being executed by first processor, the content can be presented in a browser window, app, or other such interface. In some instances, the first presentation (415) can include opening a new window and presenting the content in the new window. The first display can include a primary integrated display of the device. For example, a device can include two hinged surfaces, where a bottom surface can be configured to rest on a support (e.g., table, lap, etc.) and includes a keyboard and another surface can be configured to open from the bottom surface and to be non-parallel from the support while the device is in use. The first display can include one integrated into the other surface, e.g., on an interior surface. In some instances, the first display extends across at least 50, at least 75, or at least 90 percent of a face on the surface.

A communication can be received (420) at the second processor from a remote server. For example, a communication component can receive the communication and detect that the communication includes data or metadata that corresponds to or is otherwise intended for or associated with the second processor, or an application associated with the second processor, and can then route the communication to the second processor.

The communication can include information corresponding to or otherwise associated with information included in the first presentation. For example, the communication can include a second value that corresponds to the first value, and (in some instances) can include additional information (e.g., a destination name) that corresponds to data identified in the first presentation. The correspondence need not indicate that the values (or other data) match. For example, whether the first and second values match can indicate whether the content received from the web server, as reflected in the first presentation, is trusted and/or accurate. Alternatively or additionally, a discrepancy between the first and second values, or any other transaction-related information, can indicate a lack of data integrity or a potential security threat. The communication received at the second processor can have been generated at the remote server in response to receipt of another communication from the web server.

For example, the web server or associated system can have transmitted the other communication to the remote server, e.g., in response to receiving the content request from the device. The other communication can have included the second value and/or additional information that at least partly define a potential transaction. The remote server can store this data in association with identifying information, such as an identifier of a session, of the device, of the web server, of a webpage, and/or of a date and time to use for a later data comparison should the remote server receive a subsequent request from the web server or associated system to proceed with the transaction. If differences in the data are detected, the remote server can then reject the request. Thus, it can be advantageous for the web server to provide accurate data in the communication.

The second processor can be configured to operate independently from the first processor, such that an action performed by one of the first and second processors does not influence operation of the other of the first and second processors. The first and second processors can execute different operating systems and/or different iterations of an operating system. This independence can inhibit or prevent one of the processors from being affected by a security threat (e.g., virus) as a result of the other processor being affected by the security threat. For example, the first processor can be a general purpose processor executing an unsecure OS, while the second processor can be a secure processor executing a secure OS. As discussed below, in the event a transaction detail in the information presented on a display controlled by the first processor is manipulated, e.g., to reflect a lower price, the corresponding information presented on a separate display controlled by the secure processor can show a different value (e.g., the actual value) for the transaction detail—thereby indicating a potential risk through the discrepancy.

A secure verification output that includes a representation of the second value can be generated (425) (e.g., using the second processor). Generating the secure verification output can include extracting data from the communication received from the remote server and/or generating a new data object (e.g., image, audio stimulus and/or text presentation) based on the data in the communication received from the remote server. For example, the communication can include a signed image object, and generating the secure verification output (425) can include identifying the part of the communication corresponding to the image object. As another example, the communication can identify the second value (e.g., a second destination name), and the second processor can generate a signed image, audio signal and/or visual presentation (e.g., including text) that includes the second value (e.g., and second destination name).

In some instances, the second processor can be involved in validating a signature included in the communication from the remote server. In some instances, performance of generating the secure verification output (425) can be conditioned upon whether the signature is validated.

Validating the signature can include, for example, determining whether the signature is consistent with a stored key or algorithm, determining whether a format of the signature matches or corresponds with a stored defined type of format, and/or determining whether part or all of the signature matches or accords with a defined or stored format or value.

A second presentation (430) of the verification output at the device can be facilitated using the second processor. The second presentation can include one to be concurrently, at least for a period of time, presented with the first presentation of the content. For example, at least some of the second presentation can coincide with (or overlap) at least some of the first presentation. The second presentation can be presented on a second display separate from the first display. In some implementations, the second display can be implemented as, for example, a dynamic function row of the device or other such secondary display. In some implementations, the second display can be positioned, for example, near, adjacent to, or on a same surface as a keyboard. Further, in some implementations, the second display can be controlled independently of the first display. In some instances, the second display includes a display that is only controlled by instructions from the second processor, such as a secure processor.

Thus, process 400 can facilitate presentation of transaction-related information on multiple displays, each of which can include at least a value and/or other transaction-related information. The coincident presentation on separate displays can enable a user to compare values and/or other information between the presentations. Matching values and/or matching other information can indicate that content associated with the transaction, e.g., from the web server, is trustworthy and/or that a proposed transaction is secure. In some embodiments, a device can include multiple components (e.g., processors, operating systems and/or displays) that are actually, effectively and/or functionally isolated, such that individual security threats affecting part of the device are unlikely to, or cannot, compromise another aspect of the device. For example, manipulation of a processor or other aspect of a device to result in the presentation of one or more items of incorrect transaction information (e.g., a price) on one display may not be able to similarly impact an independent secure processor that controls the presentation of corresponding transaction-related information on a separate second display, thereby allowing a discrepancy in at least one transaction-related parameter to be identified before a transaction is confirmed or otherwise completed.

The device can be configured to receive an input subsequent to at least part of the coincident presentations that indicates that a transaction is authorized and requests that secure information be transmitted to a destination. For example, the input can include a touch on a touch ID reader from a user with one or more fingerprint characteristics that match a profile. Secure information (e.g., that includes an identifier of an account) can then be retrieved from a secure data store (e.g., from a secure element), optionally decrypted, and transmitted to the remote server and/or web server. In some instances, other information, such as the first value can also be transmitted to the remote server and/or web server.

Figure 5:
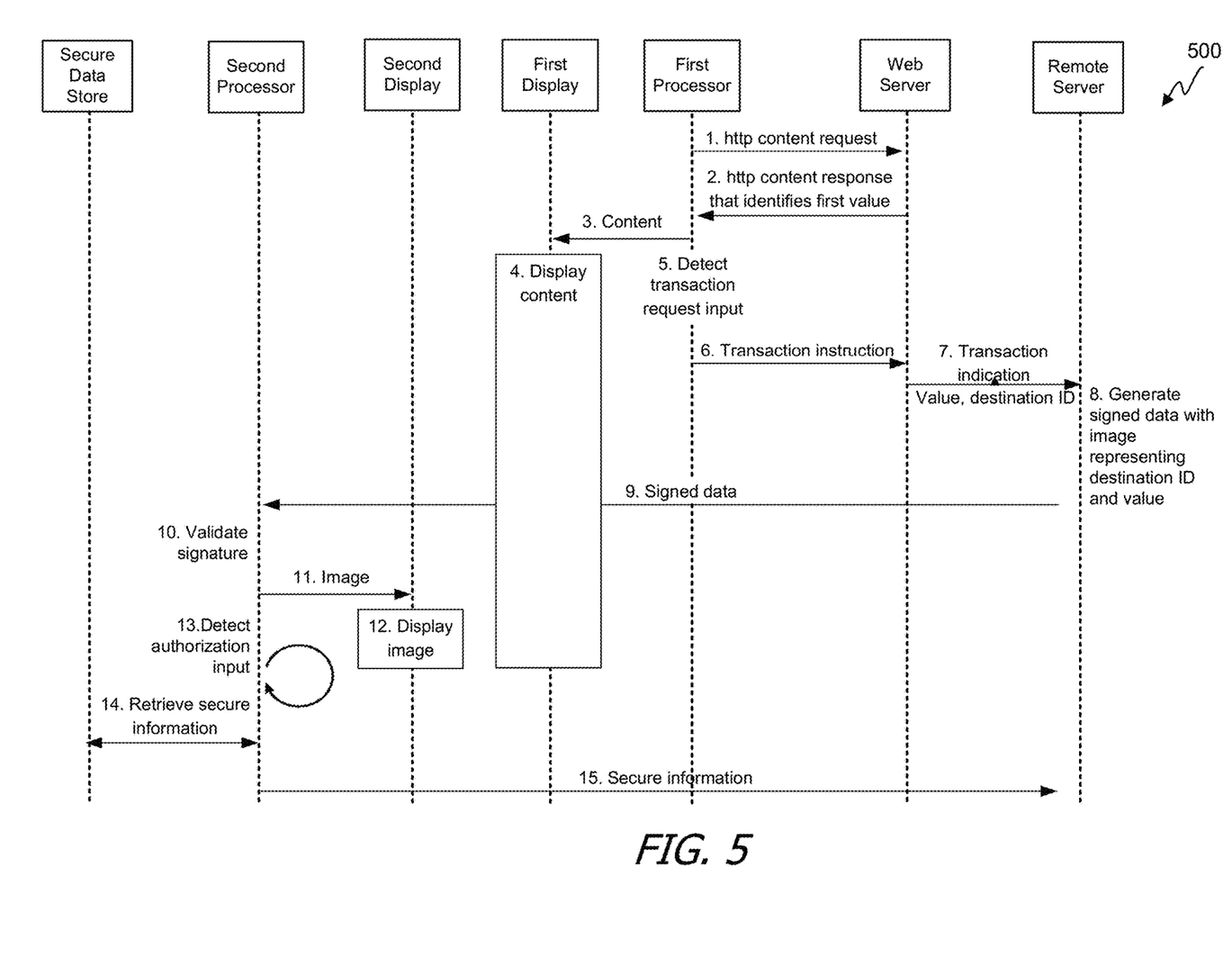

FIG. 5 is a flow diagram of an example process 500 for facilitating an assessment of data integrity. Process 500 includes communication exchanges between various devices and device components. A user device can include, among other elements, each of the first processor, first display, second processor, second display and secure data store. In some implementations, the second processor can be a secure processor incorporating or otherwise associated with a secure element and the secure data store. Further, in some implementations, the second processor can control the second display, at least during certain periods, such that content can be securely rendered to the second display independently of the first processor.

A first action can include sending a content request from a user device, using a first processor, to a web server or other such device. In some implementations, the content request can include an http content request and/or a request for web data. A second action can include transmitting, e.g., from the web server to the user device, a response that includes the requested content (to be handled by the first processor). The content can include one or more parameters associated with a potential transaction, such as a value and/or a destination.

A third action can include the first processor sending the content to a first display (e.g., an integrated first display) for presentation. For example, the first processor and/or one or more associated components can format the content for output to a display. A fourth action can include the first display displaying the content. For example, the content can be presented as a web page, pop-up window, payment sheet, etc. in a browser or in another such window or application. The content can be displayed for a period of time. The period of time can include one defined by an end time corresponding to, for example, a time at which a navigation input is received, e.g., at an interface of the device (e.g., corresponding to a new content request), a time at which new content (e.g., of a particular type, such as content corresponding to a new webpage, is received from the web server or another device) and/or a time at which user input corresponds to a request to exit from or close an application.

A fifth action can include the first processor detecting an input that corresponds to a request to initiate a transaction process. The input can include, for example, a click, tap, touch, or other such input/gesture/command (e.g., on a mouse, track pad or touchscreen) corresponding to an option in the displayed content that signals intent to initiate a transaction. For example, the input can include clicking, touching, or tapping on a part of the displayed content that corresponds to a link identified as one that initiates the transaction process (e.g., a "buy" button). The input also can include entry of one or more keystrokes identifying the request or a vocal command received at a microphone. In some instances, the request input may cause the content that was displayed at the fourth action to be changed or updated. For example, the content may be updated to identify fields for accepting transaction information, to identify transaction information, or to identify an option to confirm completion of a transaction.

A sixth action can include the first processor facilitating sending a transaction instruction to the web server. The instruction can include, for example, information corresponding to the input (e.g., which link was selected), information corresponding to a user device (e.g., device identifier and/or IP address), and/or information corresponding to a communication exchange (e.g., session identifier).

A seventh action includes the web server sending a communication that includes a transaction indication to a remote server, such as a remote server that controls release of user account information or processing of a payment transaction. The indication can include at least one of the one or more parameters included in the content and/or defining a potential transaction associated with the content. For example, the indication can include a value (e.g., price) and destination (e.g., merchant name or identifier) of an item presented as being for sale in the content. The indication can also include information about the user device (e.g., unique device identifier, IP address, operating system, and/or browser being used) and/or present communication exchange (e.g., webpage, domain name, or other identifier of the content being displayed and/or a session identifier).

An eighth action can include the remote server generating signed data based on the communication from the web server. In some instances, the signed data represents each of one, multiple, or all parameters identified in the communication. For example, the signed data can include one or more numbers identifying the value associated with a transaction and/or the name of a destination. In some implementations, the signed data can be generated as an image object that can be rendered to a display. In some other implementations, the signed data can include an audio file that represents the value and/or destination name in a manner that can be output as an audio signal, such as through one or more speakers. The signed data also can be represented in text or any other data format or formats that can be interpreted by the user device.

The generation can include generating a signature based on an object (e.g., image object) and one or more keys. For example, the signature can include a hash value generated based on the object and a hashing algorithm that is encrypted using a private key. The encryption can be performed such that a receiving device can use a public key (e.g., provided in a certificate issued to the receiving device) to decrypt the hash value. The receiving device can use the hash value to ensure that the accompanying object has not been compromised. The signed data can further identify (for example) a hashing algorithm.

At a ninth action, the remote server sends the signed data to a second processor at the user device. The second processor can control (e.g., detecting inputs and identifying outputs) a second display of the user device. The second display can be implemented as or otherwise include, for example, a virtual keyboard or digital function row. Further, the second display can include a touchscreen. The second display can be configured to, at least some of the time, present one or more input options that can be selected, e.g., via touch of an associated area. The one or more input options can include, for example, one or more functions (e.g., F1, F2, etc.) and/or screen input/output controls (e.g., brightness of a first display, volume of speakers, etc.). The second display can be configured such that presentations at the display can change in time (e.g., in response to user input detected at the second display or other input component and/or in response to an instruction of an application being executed at the second processor).

The second processor can be independent of, physically distinct from, and/or not connected (e.g., via electronic circuitry) to the first processor. In some instances, one or more rules indicate which types of communications are to be routed to which of the first and second processors, and/or which types of communications and/or functions each of the first and second processors are to process respectively.

At a tenth action, the second processor validates a signature associated with the signed data. The validation can include, for example, decrypting the signature using a stored public key (e.g., previously received from the remote server) and/or determining whether the signature and/or decrypted signature corresponds with particular data. In some instances, the determination includes determining whether a hash value identified in the decrypted signature matches a hash value that the second processor generates using, e.g., the received image, and a hashing algorithm (e.g., which can be predefined or identified in the decrypted signature).

At an eleventh action, the second processor sends the validation content received from the remote server, such as the image, or other renderable content, to the second display (e.g., an integrated second display of the device), and a twelfth action can include the second display presenting the content. For example, the content can be presented across all or part of a dynamic function row, virtual keyboard, or other such integrated display. The image can be presented for a period of time (e.g., a predefined period of time or until an event occurs). The display (e.g., of the image) on the second display can at least partially overlap in time with the display of the content on the first display.

The period of time for which the image is displayed can include one defined by an end time corresponding to, for example, a predefined time period, a time at which an input of one or more defined types is received, or a combination thereof (e.g., an earlier of the two). The input can include one received at a user interface controlled by and/or accessible to the first processor, a user interface controlled by and/or accessible to the second processor, or another user interface. The input can include one that corresponds to an authorization, or a rejection, of a transaction. For example, the input can include touching one of multiple defined portions of a dynamic function row, virtual keyboard, or other such integrated display at which an actionable control is displayed.

A thirteenth action can include the second processor detecting an input that corresponds to an authorization to conduct a transaction corresponding to the content and/or image, e.g., presented on the second display. In some instances, the input includes a biometric authentication, such as a touch at a touch ID reader with one or more fingerprint characteristics matching that of a profile. In some other instances, the input can include, for example, a click, tap, touch, or other such input on the second display or an input/output component communicatively coupled with either or both of the first processor and/or the second processor. In some other instances, detecting an authorization input includes detecting that each of multiple types of inputs (e.g., received at one or more user interfaces) was received within a defined period of time. Whether a user input component (e.g., touch ID reader) is powered on or configured to accept inputs and/or whether an input is recognized as an authorization input can depend on a context. For example, in some implementations, the second processor can only recognize a biometric authentication (or other such authentication), e.g., a touch ID, as a transaction authorization if the biometric authentication is detected while the transaction related information is presented on the second display, within a predetermined period of time of presenting the transaction related information on the second display, or other such qualifying event.

At a fourteenth action, in response to detecting the authorization input, secure information (e.g., including an account identifier) can be retrieved from a secure data store. In some instances, a secure element hosts the secure data store and can control data access. The secure information can also be locally processed to, e.g., decrypt the information, encrypt the information, and/or transform the information to include more, less or different information. A fifteenth action includes sending the secure information (or processed version thereof) to the remote server or other server, e.g., to continue processing the transaction.

Embodiments, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various disclosed features can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. An electronic device comprising:
a first display configured to output visual stimuli;
a multi-function display configured to output visual stimuli, the multi-function display being configured to alternately operate in a first mode, in which at least one representation of a selectable function is output, and a second mode, in which a secure verification output is output;
one or more first hardware processors configured to output particular content received from a web server on the first display, the one or more first hardware processors being communicatively coupled to the first display, and the electronic device being configured such that output at the multi-function display cannot be controlled by the one or more first hardware processors; and
one or more second hardware processors, separate from the one or more first hardware processors, configured to output, in the second mode, the secure verification output to the multi-function display concurrently with the output of the particular content on the first display, the secure verification output being based on a data item received form a verification server,
wherein the secure verification output indicates whether at least part of the particular content is consistent with the data item.

2. The electronic device of claim 1, wherein the one or more second hardware processors comprise a secure processor configured to control the multi-function display independently of any of the one or more first hardware processors.

3. The electronic device of claim 1, wherein:
the particular content further identifies a first destination name;
the data item further represents a second destination name; and
the secure verification output further identifies the second destination name.

4. The electronic device of claim 1, further comprising:
a secure data store that stores secure information;
wherein the one or more second hardware processors are coupled to the secure data store and configured to:
retrieve the secure information from the secure data store; and
transmit a secure communication to the verification server, the secure communication including the secure information.

5. The electronic device of claim 4, further comprising:
a secure element that hosts the secure data store.

6. The electronic device of claim 1, wherein the data item further includes a signature of the data item, and wherein the one or more second hardware processors are further configured to:
determine, based on the signature, that the data item is valid;
wherein the secure verification output is selectively output when the data item is valid.

7. The electronic device of claim 1, further comprising:
a secure data store that stores secure information;
wherein the one or more second hardware processors are further configured to:
detect, during the concurrent output of the particular content on the first display and the secure verification output on the multi-function display, an input corresponding to a request to transmit secure information; and
in response to detecting the input:
retrieve the secure information from the secure data store; and
transmit a secure communication to the verification server, the secure communication including the secure information.

8. The electronic device of claim 1, wherein:
the first display includes a primary integrated display of the electronic device.

9. The electronic device of claim 1, wherein:
the electronic device includes:
first code corresponding to a first operating system; and
second code corresponding to a second operating system comprising a secure operating system;
the one or more first hardware processors are configured to execute the first code corresponding to the first operating system; and
the one or more second hardware processors are configured to execute the second code corresponding to the second operating system, but not to execute the first code corresponding to the first operating system.

10. The electronic device of claim 1, wherein the electronic device includes a laptop computer that includes:
a display panel that includes the first display; and
a base assembly that includes the one or more first hardware processors, the one or more second hardware processors, and the multi-function display;
wherein the display panel is connected to the base assembly via one or more hinges.

11. A method for using multiple processors on a device to generate verification outputs based on web server communications, the method comprising:
transmitting, using a first processor of the device, a content request communication to a web server;
receiving a response communication from the web server, the response communication comprising particular content;
facilitating, using the first processor, a first presentation of the particular content on a first display of the device;
receiving, from a verification server, a data item having been generated at the verification server in response to receipt of another communication received at the verification server from the web server;

generating, using a second processor, a secure verification output, the secure verification output being based on the data item received from the verification server, wherein the secure verification output indicates whether at least part of the particular content is consistent with the data item; and facilitating, using the second processor, a second presentation of the secure verification output at the device concurrently with the first presentation of the particular content, wherein the second presentation is presented on a multi-function display of the device is separate from the first display.

12. The method for using multiple processors to generate verification outputs based on web server communications of claim 11, wherein:

the second processor comprises a secure processor configured to control the multi-function display independently of the first processor.

13. The method for using multiple processors to generate verification outputs based on web server communications of claim 11, wherein:

the particular content further identifies a first destination name;

the data item further represents a second destination name; and the secure verification output further identifies the second destination name.

14. The method for using multiple processors to generate verification outputs based on web server communications of claim 11, further comprising:

retrieving, using the second processor, secure information from a secure data store at the device; and transmitting a secure communication to the verification server, the secure communication including the secure information.

15. The method for using multiple processors to generate verification outputs based on web server communications of claim 14, further comprising:

a secure element that hosts the secure data store.

16. The method for using multiple processors to generate verification outputs based on web server communications of claim 11, wherein the data item further includes a signature of the data item, and wherein the method further includes:

determining, based on the signature, that the data item is valid;

wherein the secure verification output is selectively presented when the data item is valid.

17. The method for using multiple processors to generate verification outputs based on web server communications of claim 11, further comprising:

detecting, during the concurrent first presentation and second presentation, an input corresponding to a request to transmit secure information; and in response to detecting the input:

retrieving secure information from a secure data store at the device; and transmitting a secure communication to the verification server, the secure communication including the secure information.

18. The method for using multiple processors to generate verification outputs based on web server communications of claim 11, wherein:

facilitating the first presentation of the particular content at the device includes facilitating the first presentation of the particular content on a primary integrated display of the device.

19. The method for using multiple processors to generate verification outputs based on web server communications of claim 11, wherein:

the device includes:

first code corresponding to a first operating system; and second code corresponding to a second operating system comprising a secure operating system;

the first processor is configured to execute the first code corresponding to the first operating system; and the second processor is configured to execute the second code corresponding to the second operating system, but not to execute the first code corresponding to the first operating system.

20. The method for using multiple processors to generate verification outputs based on web server communications of claim 11, wherein the device includes a laptop computer that includes:

a display panel that includes the first display; and a base assembly that includes the first processor, the second processor, and the multi-function display;

wherein the display panel is connected to the base assembly via one or more hinges.

* * * * *

UNITED STATES PATENT AND TRADEMARK OFFICE
CERTIFICATE OF CORRECTION

Page 1 of 1

PATENT NO. : 11,025,644 B2
APPLICATION NO. : 16/509412
DATED : June 1, 2021
INVENTOR(S) : Gianpaolo Fasoli et al.

It is certified that error appears in the above-identified patent and that said Letters Patent is hereby corrected as shown below:

On the Title Page

Item (57) the Abstract should read:
A content request communication, e.g., generated using a first processor of a device, can be transmitted to a web server. A response communication including content identifying a first value can be received from the web server. The first processor can facilitate presentation of the content on a first display of the device. A communication can be received at a second processor of the device from a remote server. The communication can include data representing a second value and can be generated at the remote server using information received from the web server. Further, the second processor can produce a secure verification output that can be presented on a separate, second display, representing at least the second value. The presentation on the first display can at least partially overlap in time with the presentation on the second display.

In the Claims

Column 21, Claim 1, Line 50, delete "received form a verification" and insert --received from a verification--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*